United States Patent [19]

White et al.

[11] 4,329,202
[45] May 11, 1982

[54] CONTINUOUS HEATING PROCESS FOR PRODUCING CHAR FROM CELLULOSIC MATERIAL

[75] Inventors: Eugene W. White, State College; Francis M. Gross; Fred E. Knoffsinger, both of Pleasant Gap, all of Pa.

[73] Assignee: Enerco, Inc., Langhorne, Pa.

[21] Appl. No.: 235,764

[22] Filed: Feb. 18, 1981

Related U.S. Application Data

[60] Continuation of Ser. No. 972,392, Dec. 22, 1978, abandoned, which is a division of Ser. No. 780,679, Mar. 23, 1977, Pat. No. 4,165,216.

[51] Int. Cl.³ .................. C10B 27/02; C10B 53/02; C10L 5/44; C10L 9/08
[52] U.S. Cl. .................................. 201/27; 44/1 E; 201/29; 201/34; 201/37
[58] Field of Search .................. 972/392; 201/2.5, 21, 201/25, 29, 32, 34, 36, 27, 37; 48/209; 44/1 D, 1 E, 1 F

[56] References Cited

U.S. PATENT DOCUMENTS

| | | | |
|---|---|---|---|
| 683,268 | 9/1901 | Gardner | 201/2.5 |
| 704,886 | 7/1902 | Larsen | 208/108 |
| 843,599 | 2/1907 | Hammatt | 201/36 |
| 1,510,730 | 10/1924 | Wilcox | 201/29 |
| 1,822,383 | 9/1931 | Snyder | 201/2.5 |
| 2,160,341 | 5/1939 | Reichert | 201/36 |
| 2,289,917 | 7/1942 | Lambiotte | 201/34 |
| 2,757,129 | 7/1956 | Reeves et al. | 201/34 |
| 3,177,128 | 4/1965 | Vartanian | 201/29 |
| 3,298,928 | 1/1967 | Esterer | 201/2.5 |
| 3,977,947 | 8/1976 | Pyle | 201/29 |
| 4,164,397 | 8/1979 | Hunt et al. | 201/34 |

*Primary Examiner*—Bradley Garris
*Attorney, Agent, or Firm*—Cooper, Dunham, Clark, Griffin & Moran

[57] ABSTRACT

This invention comprises an apparatus and process for drying and/or heating materials. This invention was designed for use in the production of charcoal from wood feed material; however, it can be used to heat and/or dry many types of materials. Feed material is disposed in a reactor, wherein there is provided a first array of input channels extending through said feed material, through which hot gases are introduced into said feed material, and a second array of output channels extending through said feed material to collect and exit those hot gases and any gases or vapors derived from the heating and/or drying of the feed material.

6 Claims, 12 Drawing Figures

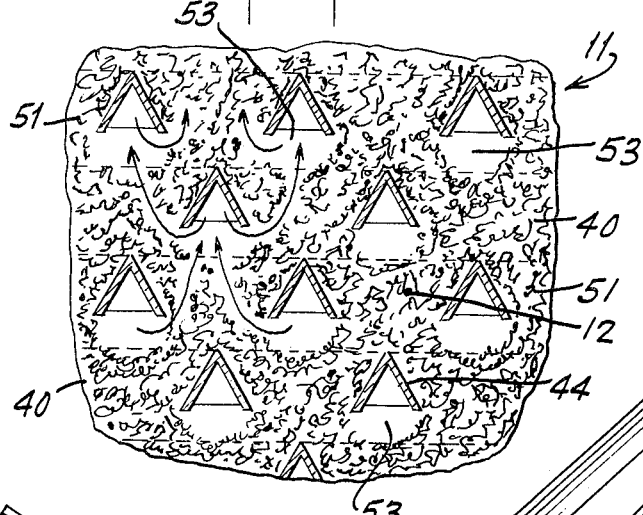
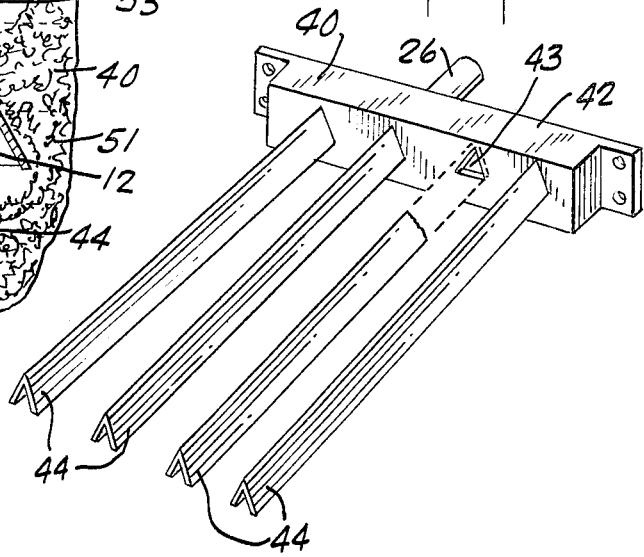
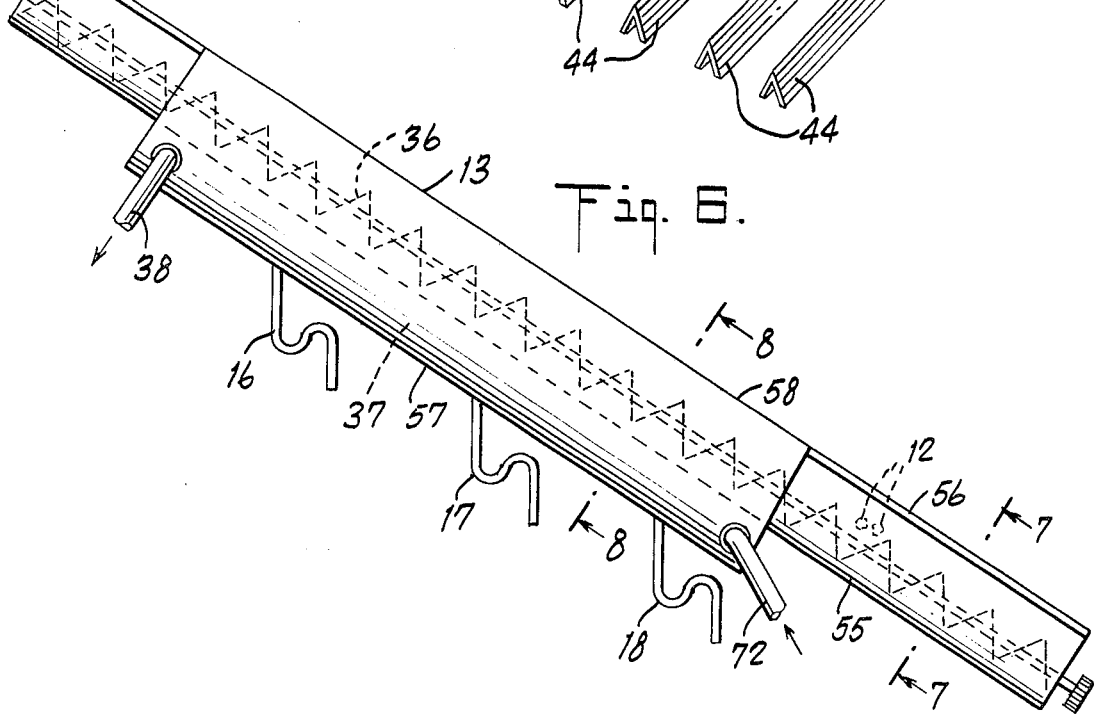
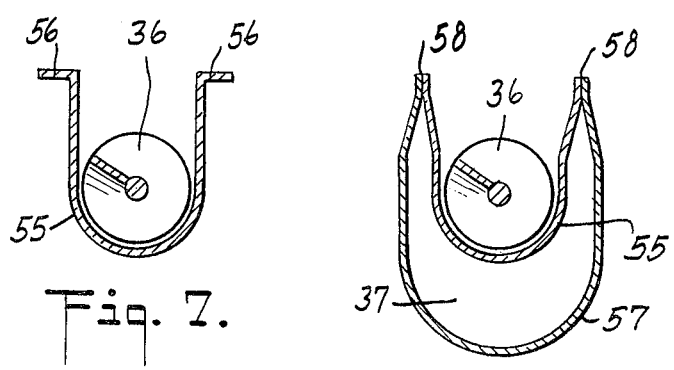

4,329,202

CONTINUOUS HEATING PROCESS FOR PRODUCING CHAR FROM CELLULOSIC MATERIAL

This is a continuation, of application: Ser. No. 972,392, filed Dec. 22, 1978 and now abandoned which is a division of Ser. No. 780,679, filed Mar. 23, 1977, now U.S. Pat. No. 4,165,216.

SUMMARY

This invention was primarily designed for the continuous production of charcoal from wood feed material. However, the invention has been found to be useful in many other areas. While its primary use is still as a charcoal producing apparatus, it can also be used in grain drying, bulk powder storage, various calcining processes, such as $CaCO_3 \rightarrow CaO$ and in many other instances. The apparatus can be used any time it is desired to dry or heat feed material such as powders, grains or chips. As the invention was primarily designed to produce charcoal, its use as a charcoal produced will be described in detail.

The basic problem of charring wood chips, or sawdust, or any wood feed to produce charcoal, is to uniformly heat a significant mass of the feed material in an oxygen deficient atmosphere while efficiently collecting and managing the evolved gases. The present invention allows for the hot gases heating the charcoal producing feed material, to be uniformly circulated therethrough, and to be uniformly collected along with the gases and vapors produced by the charcoal producing reaction. In accordance with this invention, feed material is made into charcoal in a short time, using little energy. The present invention also provides for efficient control and collection of the gases, preventing them from escaping into the atmosphere, thereby eliminating pollution. An advantage of this invention is that some of the released and collected gases and vapors are burned to provide energy to be used in the process; thus, the external energy needed for the process is reduced. Further, some of the collected hot gases are circulated in the charcoal producing process, thereby preserving energy.

The invention comprises a process and apparatus for the heating and drying of materials in powder, chip, or grain form. For convenience an apparatus embodying the invention as used as a charcoal producer is described below. However, this embodiment is but one way to carry out the inventive process and is but one embodiment of the inventive apparatus. The apparatus comprises means for circulating hot gases through woody feed material in a reactor which provides an oxygen deficient atmosphere; wherein said means include an array of input channels extending through the feed material, through which hot gases are introduced into the feed material, and an interleaved array of output channels extending through the feed material to collect, manage, and discharge said hot gases and any gases and vapors released by the charcoal producing reaction.

It is an object of this invention to provide an apparatus and process for the heating and/or drying of materials such as powders, grains, or chips.

It is also an object of this invention to provide an apparatus capable of using wood waste in the form of chips or sawdust without size sorting and to produce charcoal from them.

It is also an object of this invention to provide a charcoal producing apparatus small enough to be contained on a flat bed trailer for convenient portability.

It is also an object of this invention to provide an apparatus for the production of charcoal which is amenable to simple automation for minimal operator attention and the reactor of which has no moving parts.

It is also an object of this invention to collect condensible vapors from a charcoal producing reaction without the need for tight mechanical seals, and to burn the generated non-condensible gases to return heat into the reaction, while eliminating atmospheric pollution and reducing external energy requirements.

It is also an object of this invention to use heat from the charring process to dry the chips or sawdust feed material prior to their insertion into the charring process or apparatus.

How the foregoing and other objects are achieved are described in the detailed description below and in the accompanying figures in which:

FIG. 4 is a fragmentary vertical sectional view of the filled reactor of apparatus of FIG. 1;

FIG. 5 is a perspective view of a reactor module;

FIG. 6 is a side view of the conveyor of the apparatus of FIG. 1;

FIG. 7 is a sectional view of the conveyor taken along line 7—7 of FIG. 6;

FIG. 8 is a sectional view of the conveyor taken along line 8—8 of FIG. 6;

DETAILED DESCRIPTION

The present invention was originally designed as a charcoal producer. While numerous other uses have been found for it, its primary purpose is still as a charcoal producer; thus, the detailed description will describe the apparatus in its charcoal producing function. No limitations as to the uses of the apparatus or process are intended. In addition, while the description is of the apparatus, the inventive process is embodied in that apparatus, and the invention is not limited to an apparatus.

Charcoal is produced by heating wood feed material in oxygen deficient atmosphere. In the apparatus and process for the continuous production of charcoal there are essentially two systems involved; first, the movement of the hot gases, and second, the movement of the wood feed material into and out of the apparatus.

Figure 1:
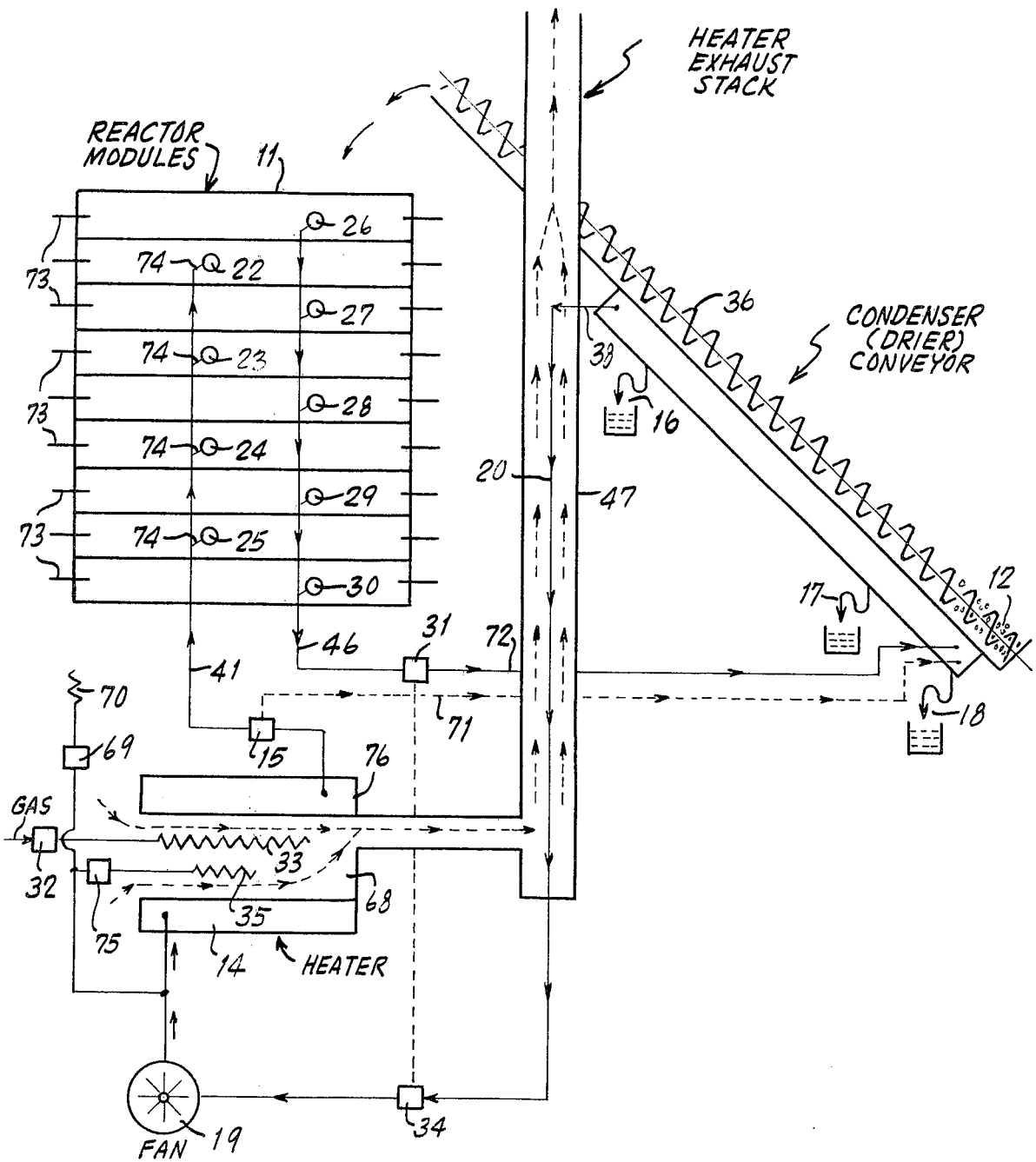
FIG. 1 is a schematic view of the apparatus.

The movement of the hot gas is shown schematically in the apparatus of FIG. 1. Fuel gas enters heating system 14 through valve 32 and is burned by upper burner 33 of the pair of burners 33 and 35. Its fume rise and exit through chimney 47. Fan 19 blows air around cylinder 76 of heating unit 14 where it is heated by the burning fuel gas and kept from mixing with the fuel gas or its fumes. In this embodiment as it is convenient, air is used as the heat carrier; however, there are no limits as to the type of gas to be heated and used as the carrier of heat, other than those imposed by the charring process itself. However, when air, meaning $O_2$ and $N_2$, is used only at start up of the apparatus, as the oxygen is consumed the feed material 12 is heated up to reaction temperature. Thereafter, gases are recirculated and any excess gas is introduced to burner 35 described below. The hot recirculating gas exits cylinder 76 through valve 15 and, during the producing stage of the apparatus, goes upwards through pipe 41, through input pipes 22,23,24, and 25, and into charcoal reactor unit 11. Dampers 74 adjust the flow through pipes 22–25 and manometers 73 measure the pressures at different levels within unit 11. As will be shown, it is desired that the pressure at the top and bottom of reactor unit 11 be at atmospheric pressure to prevent escape of polluting gases and dampers 74 and valve 75 are adjusted to achieve this.

The hot gases then circulate through the feed material 12 in reactor unit 11, as will be described below in greater detail. The hot gases and any gases produced by the charring process are collected and exit reactor unit 11 through output pipes 26,27,28,29 and 30. From there it goes through escape pipe 46, through valve 31 and pipe 72, and into chamber 37 which is positioned along a length of conveyor 13. In chamber 37 condensible vapors, in the hot gases supplied thereto, condense and move into liquid traps 16,17 and 18. The hot gases then exit chamber 37 through pipe 38, and go down chimney 47 via pipe 20 where they are preheated by the fumes rising off burner 33. The hot recycled gases go through valve 34, into fan 19, and then, in part, go through valve 75 to be burned in burner 35 and, in part, go through cylinder 76 to be reheated and recycled.

While the hot gas is being recirculated, feed material 12 moves as follows. It is first placed on conveyor 13 and is carried up conveyor 13 by screw auger 36 while being heated and dried by the hot gas in chamber 37. The feed material 12 is then dropped through connection 39 into the top 49 of reactor unit 11. Feed material 12 at the top 49 of reactor unit 11, slowly makes its way down through reactor while being heated to the hot gas and made into charcoal. The charcoal is then removed from the bottom 50 of the reactor unit 11 by removal auger 48.

Feed material 12 moves down the reactor unit 11 due to the removal of charcoal by removal auger 48 and due to the continuous shrinkage of the feed material 12 during the charring process. Therefore, the speed of conveyor 13, of fan 19, and of removal auger 48 are set such that feed material 12 is converted into charcoal by the time it reaches the bottom 50. This permits the process and apparatus to be continuous as new feed material is constantly being added at the top 49 of reactor unit 11, while charcoal is constantly removed from bottom 50 of reactor unit 11. Downward movement of the feed material 12 through the reactor unit 11 is assisted by the vibration imparted to reactor unit 11 by fan 19, load auger 36, unload auger 48, and the machines driving them. Should plugging or clogging of the reactor 11 ever be a problem, the lodged material could be loosened by auxiliary mechanical jarring of the reactor unit 11. If such lodging becomes frequent, intermittent jarring is easily mechanized.

Reactor unit 11 has a wall 45 on its one side, and opposed alternatingly stacked input 51 and output 40 reactor modules. FIG. 5 shows a typical output module 40. Output pipe 26 is connected to output module 40 which has angled members 44 connected to its core 42 at holes 43. The only difference between an input module 51 and an output module 40 is the number and position of the holes 43 and of the angled members 44 and 52. An input module 51 has five holes 43 and three full angled members 44 and two half angled members 52, whereas an output module has four holes 43 and four full angled members 44. (See FIG. 3).

Figure 3:
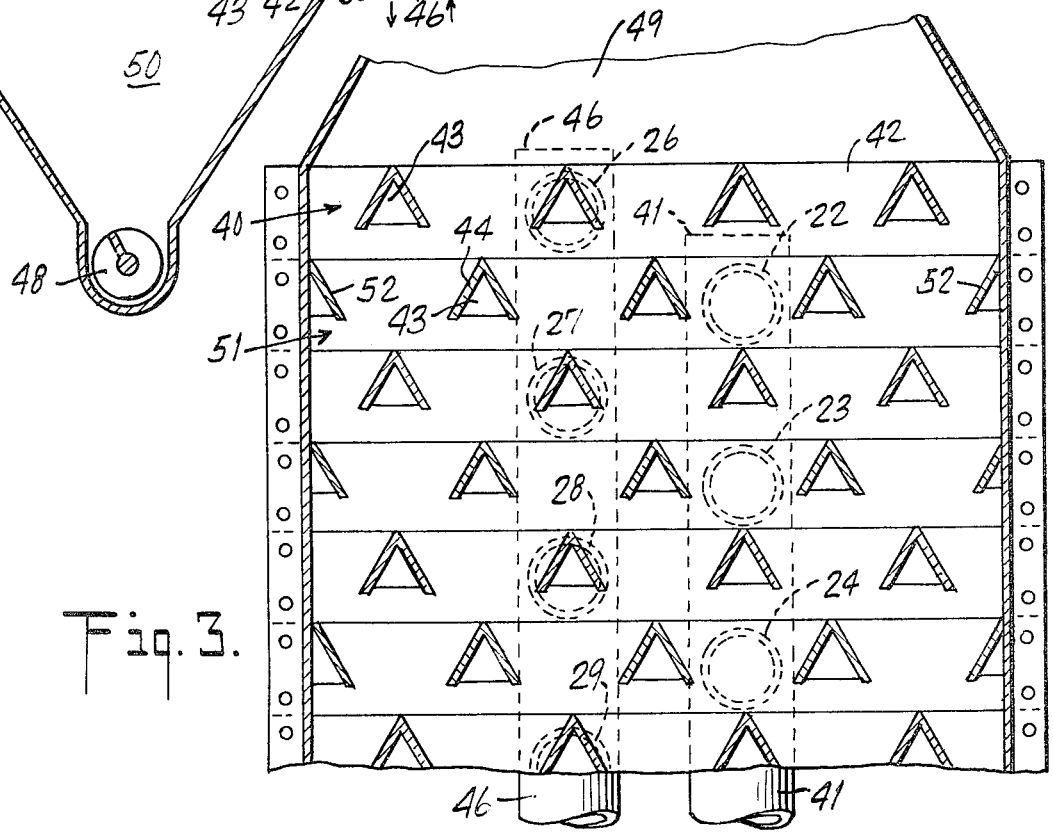
FIG. 3 is a sectional view taken along lines 3—3 of FIG. 2.

FIG. 3 shows a more detailed picture of the alignment of modules 40 and 51 and of their respective holes 43 and angled members 44 and 52. Feed pipe 41 is shown connected to input pipes 22–25 which are, in turn, connected to input modules. Escape pipe 46 is connected to output pipes 26–30 which are in turn connected to output modules 40. The holes 43 of input reactor module 51 and output reactor module 40 are offset as shown. The ratio of holes 43 and their relative alignment is a more preferred embodiment of the invention and is not required.

FIG. 4 shows the flow of gases. A portion of reactor unit 11 is shown filled with feed material 12. Diamond shaped channels 53 are created in feed material 12, as it is deflected by angled pieces 44 and 52 (52 not shown in FIG. 4) while moving downward through reactor unit 11. Hot gases flow from feed pipe 41, through input pipe 22, into core 42 on through the five holes 43, and into channels 53 created by angled members 44 and 52. The hot gases then circulate through feed material 12 and are collected by and exit through channels 53 created by angled members 44 of the output modules 40. These channels 53 provide large surface areas for the hot gases to uniformly penetrate the feed material 12. In addition the gases have short distances to travel preventing condensation of the gas vapors in cool areas of the feed material 12.

Channels 53 extend through feed material 12 and are created by angled members 44 and 52 which push feed material 12 aside as it moves downward. Any other means for producing such channels 53 is equally within the scope of this invention. Not only angled members 44 will create channels 53 within the scope of the invention, but also flat members, flat members with slightly curved edges, inverted U-shaped members, or even cylindrical members with apertures at their bottom. In this embodiment, the means for creating a channel also break up and stir the feed around as it moves downward.

Channels 53 allow the introduction of the hot gases throughout their entire length, which is substantially the entire width of reactor unit 11. Thus, feed material 12 along the entire width of reactor unit 11 is uniformly heated by the hot gases. Without these channels 53, the hot gas would enter the reactor unit 11 at a point or series of points and char the feed material 12 immediately surrounding the point or points. The hot gases would then go straight to an exit and only the feed material 12 along that path would get heated and char. If it charred at all, the other feed material 12 would only char after a long time, as little heat would reach it. A large waste of energy would be created as, after being made into charcoal, feed material 12 near the input channel would be heated until the heat reached feed material 12 far from the input channels. In addition, a poor quality charcoal would be produced as the feed material 12 would not be uniformly charred.

Figure 2:
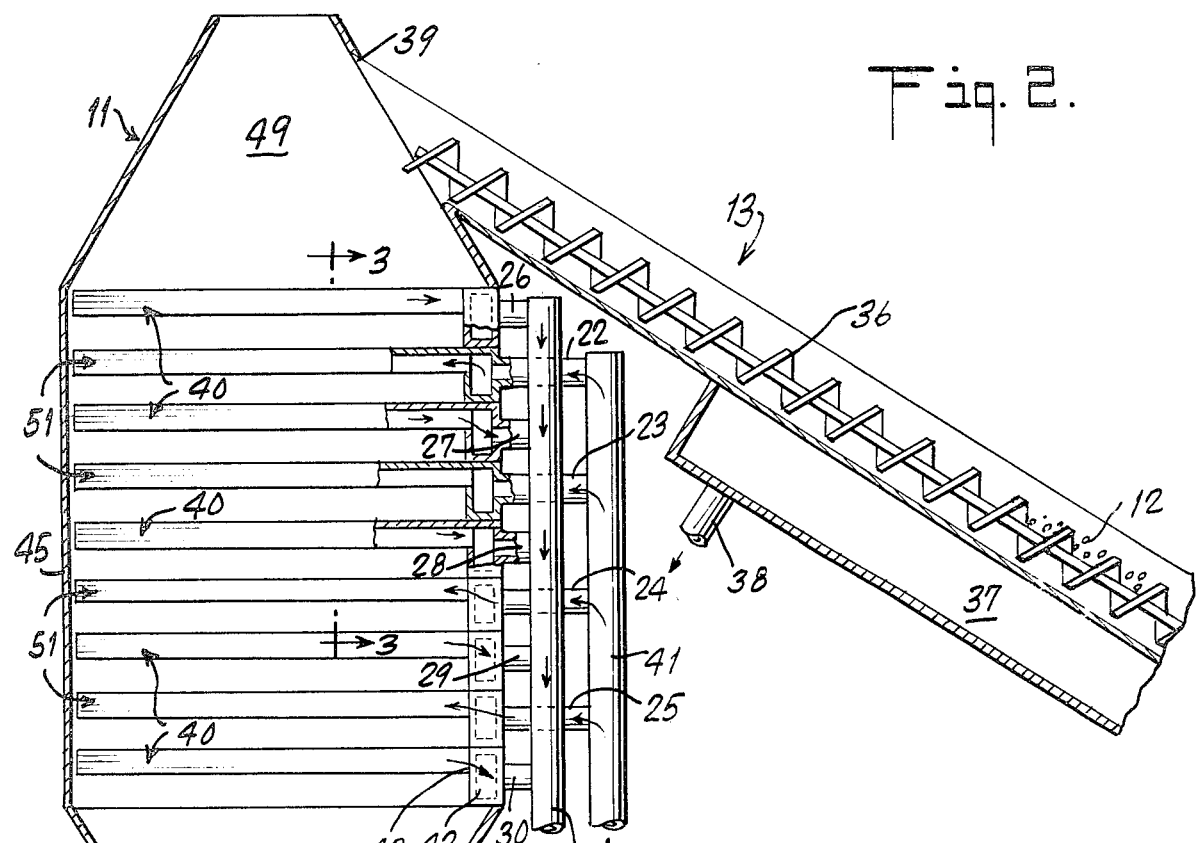
FIG. 2 is a partial vertical sectional view of the apparatus of FIG. 1.

In this, the preferred embodiment, there is a uniform array of channels 53 across substantially the entire length of unit 11 (as can be seen in FIG. 2). In addition to creating a proper circulation of hot gases these channels cause the regular break up of feed material 12 moving down reactor unit 11 and allow different portions of feed material 12 to be in direct contact with the hot gases. The channels 53 also inhibit packing or densification of material 12 in the reactor. Any local settling merely alters the bottom V-angle of channel 53 without significantly compacting material 12. At no depth in the reactor does the feed material 12 "feel" the entire load of the column of material about it, rather, the array of angled members 44 and 52 share some of the load. Furthermore, more of the individual angled members 44 and 52 bear a heavy load. The array of output channels 53 similarly allows for the uniform collection of both the hot gas and any gases or vapors produced by the charring process; thus, preventing them from merely escaping into the atmosphere and polluting it. Some of these gases can be burned to provide energy, be used again in the charring process, or be used to dry the feed material.

FIG. 6 shows feed material 12 being pushed up conveyor 13 by screw auger 36 which is driven by a motor (unseen). FIG. 7 shows a cross section of conveyor 13 at a point which does not contain chamber 37. U-shaped trough 55 with its molding 56 is shown containing screw auger 36. FIG. 8 shows a cross sectional view of conveyor 13 at a point containing chamber 37. U-shaped trough 55 and U-shaped container 57 have their upper parts welded together at point 58. Between U-shaped trough 55 and U-shaped container 57 is chamber 37.

Referring back to FIG. 1 the start-up of the operation will be described from the time at which reactor unit 11 is unfilled. To start the process, the liquid traps 16, 17 and 18 are filled to prevent the loss of hot air to the atmosphere. Burner 33 is then lit and set for maximum output, and fan 19 is started with its speed adjusted to keep output temperature at a desired level. Air is heated in cylinder 76 of heater 14 and is pushed up through valve 15 which has been adjusted to divert the hot air into pipe 71 through chamber 37 of conveyor 13, out pipe 38, down chimney 47, through pipe 20, and into heater 14 where it is reheated and recycled.

Feed material 12 is then added to conveyor auger 36 whose speed is set to ensure that the feed material 12 is dry when it reaches the top of conveyor 13. When reactor unit 11 is filled with feed material 12, valve 15 is switched to direct hot air into reactor module 11. The speed of fan 19 is adjusted so that the air exits heat exchange cylinder 76 at temperatures typically ranging from 750° to 1000° F. In order to preheat the feed material at the bottom of reactor unit 11, the dampers 74 are adjusted to allow hot air to enter the reactor unit 11 only through input pipes 24 and 25. The feed material 12 initially at the bottom of unit 11 has less of a distance to move; thus it will be heated for a much shorter time. Therefore, to ensure that it is fully charred when removed, it must be preheated.

As the feed material 12 is heated, the first evidence of a charring reaction is the evolution of vapors which condense in liquid traps 16, 17 and 18. This causes a build up of gas pressure in the system which is reflected in U tube manometers 73. Dampers 74 are then adjusted to let the hot gas go through all input pipes 22–25. The dampers 74 and valve 75 are further adjusted to keep the pressures at top manometer 73 and bottom manometer 73 just at atmospheric pressure. Pressures at monometer 73 on input modules will, of course, be above atmospheric pressure while pressures within output modules will be below atmospheric pressure. As the reaction proceeds, a flame will develop in lower burner 35, burning the combustible gases which have returned through valve 75.

During the start-up of the reaction, the accumulating gases being released from the recirculating "closed" circuit through valve 75 will not be combustible as they still consist of mostly water vapor, $CO_2$, $O_2$ and only dilute amount of combustibles ($CO$, $H_2$, $CH_3$, etc.) which will be consumed in the overhead gas flame of burner 33. However, as the reaction proceeds, the gases through valve 75 become more combustible and a flame develops in lower burner 35.

The completion of the charring reaction in reactor unit 11 is evidenced by a reduced gas flow through valve 75. When this condition is achieved, the removal auger 48 is started, new feed material 12 is loaded onto auger 36, and the machine operates as described above. During the steady state operation, burners 33 and 35 are set to maintain a constant output temperature. The speed of feed auger 36 is set to add feed material 12 to reactor unit 11 at a rate commensurate with the removal rate of removal auger 48.

While the apparatus can be continuously used to produce charcoal, it can also be stopped. To stop the operation no new feed material is loaded onto auger 36 and removal auger 48 is stopped. Valve 31 is set so that all gases which exit the reactor unit 11 through escape pipe 46 go through valve 31, down valve 34, through fan 19, and up through valve 69 to burner 70, where they are burned off without producing new hot gas in the apparatus. During this operation valve 32 and 75 are closed so that recirculating gas is not reheated. Valve 69 is adjusted to relieve any pressure build up of gases.

Figure 9:
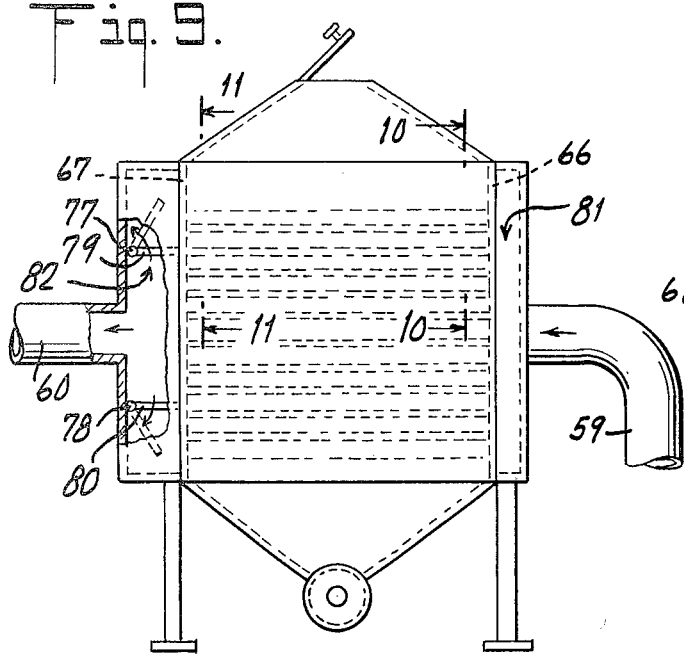
FIG. 9 is a side view of another reactor unit embodying invention.

FIG. 9 shows another embodiment of the reactor module unit of the charcoal producing apparatus. In this embodiment the heated gases enter the reactor unit through feed pipe 59 (taking the place of pipe 41), go into the chamber 81 of the reactor, through holes 63 in wall 66, and into the chambers 53 created by inlet angled pieces 62. From there the air circulates through the feed material 12, goes into chambers 53 created by the outlet angled pieces 61, through hole 64 on outlet wall 67, into the chamber 82 and out through outlet pipe 60 (which takes the place of pipe 46). As was discussed above, the pressures in the upper and lower parts of the reactor unit must be controllable, thus, baffles 79 and 80 are located in chamber 82 and can be independently opened or closed as they revolve on hinges 77 and 78. Thus, when the baffles 79 and 80 are in the horizontal positions, the pressures in the top and bottom areas of the reactor unit are allowed to build. As the baffles 79 and 80 rotate on hinges 77 and 78 into vertical positions, the gases are allowed to escape through outlet pipe 60 relieving the build up of pressure.

Figure 10:
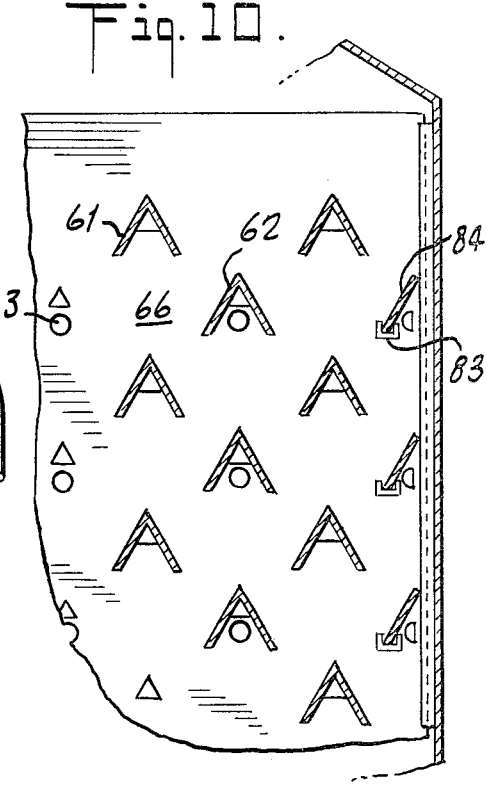
FIG. 10 is a partial sectional view of the reactor of FIG. 9 taken along lines 10—10 of FIG. 9.
Figure 11:
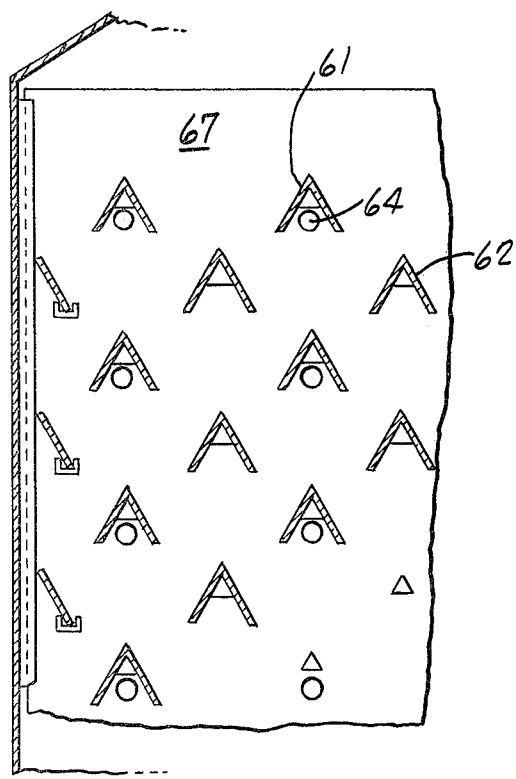
FIG. 11 is a partial sectional view of the reactor of FIG. 9 taken along line 11—11 of FIG. 9.
Figure 12:
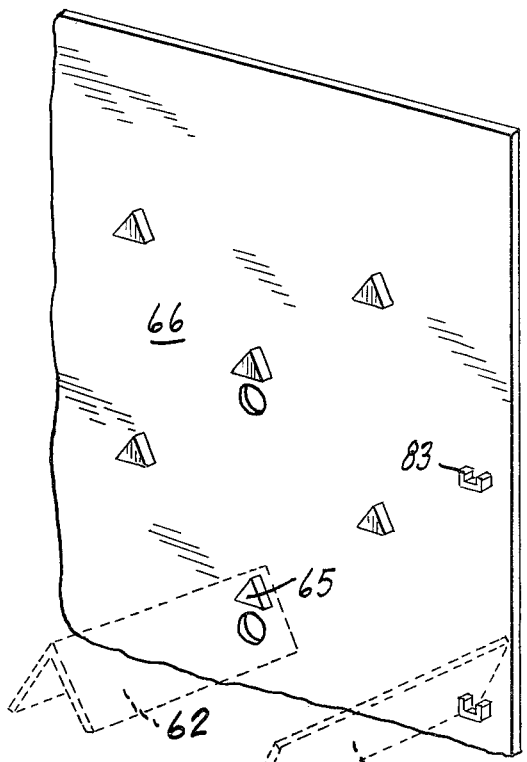
FIG. 12 is a perspective view of a wall of the reactor of FIG. 9.

FIG. 10 shows the inlet wall 66 with holes 63 inlet angled pieces 62 and outlet angled pieces 61. FIG. 11 shows outlet wall 67 with outlet holes 64 outlet angled pieces 64 and inlet angled pieces 62. As can be seen, the angled pieces in this embodiment range the whole width of the reactor unit, and are attached to the walls 66 and 67. In this embodiment, there are triangular pieces 65 and U-shaped pieces 83 (shown better in FIG. 12) upon which the angled pieces 62 hang and into which the half-angled pieces 84 are placed. While the embodiment of FIG. 9 is obviously more suited for this method of attaching the angled pieces, it is clear that in the first embodiment discussed this method could also be used.

The present invention, with its array of input channels extending through the feed material, allows for uniform charring of the feed material. The hot gases are introduced through the channels, and uniformly reach and heat the feed material to make uniform quality charcoal. Without these channels, the feed material closest to the entering hot gases would be charred first. In the present invention, no energy is wasted heating feed material that has already charred to allow hot gases to slowly make their way to feed material far from the entrance. The time necessary to char, and the energy required to char are, thereby, held to a minimum.

The array of output channels which extend through the feed material to collect the hot gases, and through which the hot gases exit, allow for an efficient collection and management of the gases. That is, both the hot air and the gases and vapors produced by the charring reaction itself, are efficiently collected and managed instead of merely being allowed to escape into the atmosphere to pollute. This efficient collection of gases has many benefits, as the collected gases can be used in the condensor conveyor to dry and heat the feed material before it enters the reactor module, or can be used again in the charring reaction after being heated. This is a benefit as these gases are already hot, and a minimum of energy is needed to bring their temperature up to that required by the charring reaction. In addition, any combustible gases (including those created by the charring), which are efficiently collected, can be used in the lower burner 35, as described. Thus, the amount of fuel gas necessary to continue the charring reaction is reduced, or eliminated entirely after start up.

While the present invention has been described as an apparatus for the production of charcoal, it has many other uses. Among those uses are grain drying, bulk powder storage and various calcining processes such as $CaCO_3 \rightarrow CaO$. As can be seen from the detailed description above, the present invention would be useful in those other applications. The present invention circulates hot gases through a mass of feed material and collects those gases efficiently. While some type of feed material undergo a reaction (wood feed material and $CaCO_3$) other types of feed material do not (grains and some powders). The apparatus or process is in no way dependent upon the feed material undergoing a reaction. The invention merely supplies the hot gases efficiently and efficiently collects them. The present invention is excellent for the drying of any type of material as the channels through the feed material regularly break up the feed material as it moves through the reactor unit. This regular breakup prevents the clumping of material, and allows different surface areas of the feed material to be exposed to the hot gases. In addition, it allows the hot gases to properly and efficiently circulate uniformally throughout the entire mass of feed material.

While the invention has been particularly shown and described with reference to a preferred embodiment of the apparatus and process thereof, it will be understood by those skilled in the art that various changes in form and details may be made therein without departing from the spirit and scope of the invention.

We claim:

1. A process for producing charcoal or char material from cellulosic material, such as wood chips, sawdust, and the like, which comprises passing cellulosic feed material through a heating and charring zone, directly and uniformly contacting the cellulosic feed material within the heating and charring zone with hot gases introduced via input means arranged and constructed to disperse the hot gases within and substantially throughout the entire zone at a substantially uniform temperature in the range 750° to 1000° F. to produce charcoal or char material and to generate combustible gas, withdrawing from the heating and charring zone charcoal or char material produced and separately withdrawing hot gases including generated combustible gas via output means arranged and constructed to collect the gases from within and substantially throughout the entire zone, heating the withdrawn hot gases to said temperature in the range 750° to 1000° F., introducing the resulting heated hot gases into the heating and charring zone in direct and uniform contact with additional cellulosic feed material to generate therefrom additional combustible gas and additional charcoal or char material, withdrawing the additional charcoal or char material and the resulting gases containing additional combustible gas, removing a portion of the withdrawn gases, combusting the removed portion of the withdrawn gases to produce hot combustion gases and employing the resulting hot combustion gases to heat the withdrawn gases before reintroducing the withdrawn gases into the heating and charring zone.

2. A process in accordance with claim 1 wherein the hot gases contacting the cellulosic feed material within the heating and charring zone are introduced into the heating and charring zone in a direction which is substantially perpendicular to the direction in which the feed material passes through the heating and charring zone.

3. A process in accordance with claim 1 wherein the cellulosic feed material is preheated or dried prior to being passed through the heating and charring zone.

4. A process in accordance with claim 1 wherein the preheating or drying is accomplished employing heat derived from hot combustion gases produced by combusting a portion of the generated combustible gas.

5. A process in accordance with claim 1 wherein the heated hot gases introduced into the heating and charring zone are oxygen deficient.

6. A process for producing charcoal or char material from cellulosic material, such as wood chips, sawdust, and the like, which comprises passing cellulosic feed material through a heating and charring zone, directly and uniformly contacting the cellulosic feed material within the heating and charring zone with hot gases introduced via input means arranged and constructed to disperse the hot gases within and substantially throughout the entire zone at a substantially uniform temperature in the range 750° to 1000° F. to produce charcoal or char material and to generate combustible gas, said hot gases contacting the cellulosic feed material within the heating and charring zone being introduced into said zone in a direction which is substantially perpendicular to the direction in which said feed material passes through said zone, withdrawing from the heating and charring zone charcoal or char material produced and separately withdrawing hot gases including generated combustible gas via output means arranged and constructed to collect the gases from within and substantially throughout the entire zone, heating the withdrawn hot gases to said temperature in the range 750° to 1000° F., introducing the resulting heated hot gases into the heating and charring zone in direct and uniform contact with additional cellulosic feed material to generate therefrom additional combustible gas and additional charcoal or char material, withdrawing the additional charcoal or char material and the resulting gases containing additional combustible gas, removing a portion of the withdrawn gases, combusting the removed portion of the withdrawn gases to produce hot combustion gases and employing the resulting hot combustion gases to heat the withdrawn gases before reintroducing the withdrawn gases into the heating and charring zone.

* * * * *